Figure 1:
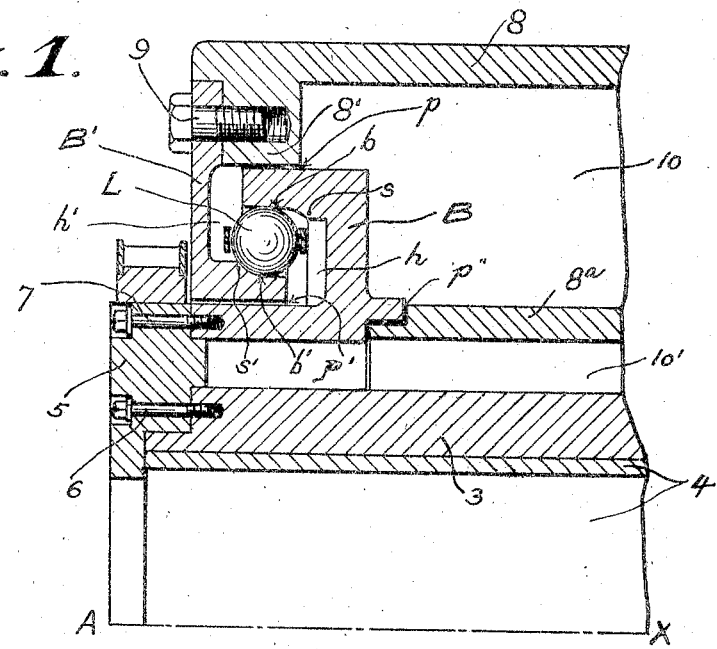

D. DE LAVAUD.
BEARING FOR CASTING MACHINES.
APPLICATION FILED OCT. 5, 1917.

1,302,641.

Patented May 6, 1919.

INVENTOR
Dimitri Sensaud
de Lavaud
BY
ATTORNEY

UNITED STATES PATENT OFFICE.

DIMITRI SENSAUD DE LAVAUD, OF NEW YORK, N. Y.

BEARING FOR CASTING-MACHINES.

1,302,641.  Specification of Letters Patent.  Patented May 6, 1919.

Application filed October 5, 1917. Serial No. 194,977.

*To all whom it may concern:*

Be it known that I, DIMITRI SENSAUD DE LAVAUD, a citizen of the United States of Brazil, residing at 24 Stone street, city, county, and State of New York, U. S. A., have invented new and useful Improvements in Bearings for Casting-Machines, of which the following is a specification.

This invention relates to centrifugal casting machines, such as are used for casting iron pipe, which machines include a rotary mold and a journaling mounting therefor.

The prime object of the invention is to provide a ball-bearing for the mold which will permit the mold to be rotated with the requisite absence of friction at all times, irrespective of varying temperatures of the mold, and consequently of varying dimensions thereof, relative to the journaling mounting and the parts fixed to the same. It is well known that the temperatures of the mold are very great during operation of the machine; sometimes reaching 3000° Fahrenheit and over.

Where the journaling mounting has itself been fixed, such mounting has sometimes formed a part of or been associated with a shell surrounding but spaced from the mold, to provide a cooling chamber between the mold and the shell, through which water or other cooling liquid may be circulated during operation of the machine. Another object of the invention accordingly, is to provide a ball-bearing adapted to be subjected to the cooling influence of the circulating liquid for the mold cooling chamber; although it will be understood of course that the invention also contemplates the provision of a ball-bearing adapted to be water cooled, if water-cooled at all, by any water circulation and irrespective of whether or not the mold is water-cooled.

A further object is to provide a ball-bearing construction in which the balls work in oil wells or baths; and in such a way, if desired, that when the ball-bearing is water-cooled as above, the water or other cooling liquid and the oil will not mix but each will be confined to its own appointed chamber.

In carrying out the invention, a structure is preferably provided comprising inner and outer ball races arranged overlappingly and hollowed out beyond the ball contacting surfaces to provide oil chambers at opposite sides of the line of balls, the races having ball contacting surfaces portions of which surfaces are straight and parallel to each other and to the axis of the machine to permit the balls to roll axially of the machine relative to their races or to permit one of the races to move relative to the other race axially of the machine.

The invention will be more clearly understood from an examination of the accompanying drawing, when taken in connection with the following description of two possible embodiments of the invention.

Figure 2:
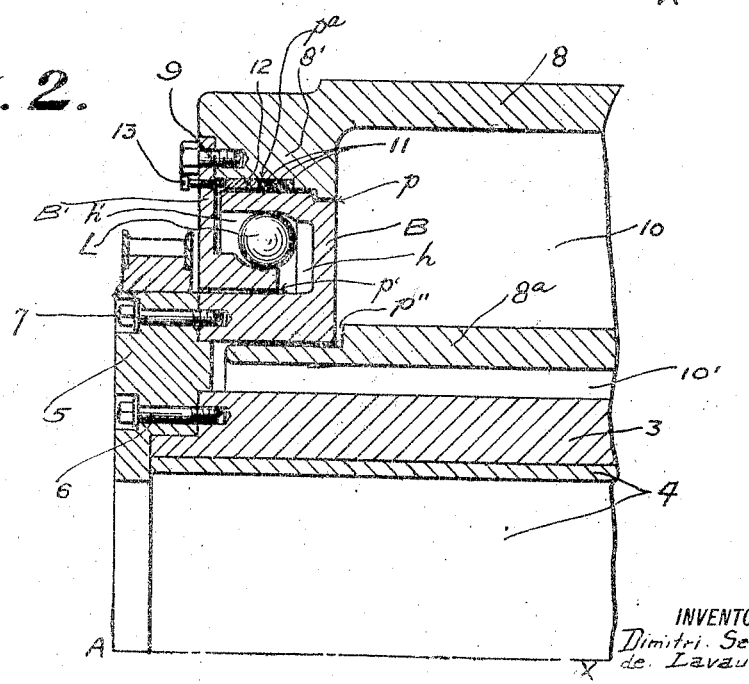

In the drawing,

Figures 1 and 2 are similar in that each shows only the upper half of an end portion of the mold.

In both these figures, 3 represents the mold and 4 a pipe cast therein.

The parts rotating with the mold 3 include a ball race B and an end plate 5, this end plate being bolted to the mold 3 as indicated at 6 and to the race B as indicated at 7.

The other ball race B' is mounted on annular member 8 by means of bolts as indicated at 9. The member 8, in the present instance, is fixed relative to the mold 3, and said member has secured therein, in some suitable way not shown, a partition $8^a$, whereby adjacent to the ball-bearing two annular chambers 10 and 10' are provided for having passed therethrough fluid for cooling the mold and other parts of the machine likely to become too hot. The cooling fluid, as water, is admitted, by means of a suitable conduit not shown, to chamber 10, thence entering chamber 10' by way of passage $p''$. (See United States Patent No. 1,276,038 issued to me.)

The balls are indicated at L.

Referring particularly to Fig. 1, race B is provided with a straight ball contacting surface $b$, and race B' is provided with a similar surface $b'$; the two surfaces being substantially parallel to the axis A—X of the machine and consequently substantially parallel to each other. As viewed in Fig. 1, the right end of the surface $b$ of race B merges into a curved surface $s$ constituting a stop-portion relative to the balls L; and the left end of surface $b'$ of race B' merges into a curved surface S' constituting a stop-portion relative to said balls. The ball-contacting surfaces of Fig. 2 are similarly formed. Thus, while the balls L may roll axially of the machine, the stop-portions $s$ and $s'$ limit the balls predeterminately and restrain them at a point short of the point where they would leave the races B and B′.

It will be noted, especially when the portion 8′ of the member 8 is considered a part of the race B′, as in effect it actually is, that each race B and B′ is substantially U-shaped in cross-section; the races being hollowed out, at $h$ and $h'$, beyond the ball contacting surfaces, to provide oil chambers or wells at opposite sides of the balls.

I have found that the relatively movable circumferential surfaces on the ball races and on the other parts of the machine may in practice be so closely spaced as to provide passages $p$ and $p'$ to prevent seepage from the oil in the chambers $h$ and $h'$. Thus oil does not leave these chambers, either to the exterior of the machine, by way of the passage $p'$, or to the water chamber 10, by way of the passage $p$. At the same time, no water from the chamber 10 passes in the reverse direction through the passage $p$ to mix with the oil in the chambers $h$ and $h'$. I have also found, however, that separating gaskets may conveniently be employed, and such a construction is shown in Fig. 2 and believed to be preferable. Here the passage $p$ is enlarged at $p^a$ for the reception of separating gaskets 11 and a gasket clamping and compressing ring 12, this ring being adjusted by screws or the like, one of which is shown at 13.

I claim:

1. In a centrifugal casting machine, the combination with a rotary mold and a journaling member therefor of a ball bearing for the mold comprising an inner race, an outer race, and a plurality of balls between the two races, the second race being secured to the mold and the first race to said member and the two races having substantially parallel straight surfaces substantially parallel to the length of the machine.

2. In a centrifugal casting machine, the combination with a rotary mold and a member upon which the mold is mounted for rotation relative thereto, of a ball bearing for the mold comprising an inner race, an outer race, and a plurality of balls between the two races, the second race being secured to the mold and the first race to said member, and the two races having oppositely but reversely arranged ball retaining surfaces, each of such surfaces being defined by a curved line and a straight line in prolongation of the curved line.

3. In a centrifugal casting machine, the combination with a rotary mold and a member upon which the mold is mounted for rotation relative thereto, of a ball bearing for the mold comprising an inner race, an outer race, and a plurality of balls between the two races, the second race being secured to the mold and the first race to said member, and the two races having oppositely but reversely arranged ball retaining surfaces, each of the surfaces being partially straight to permit the balls to roll parallelly to the mold's axis between the two races.

4. In a centrifugal casting machine, the combination with a rotary mold and a member upon which the mold is mounted for rotation relative thereto, of a ball bearing for the mold comprising an inner race, an outer race, and a plurality of balls between the two races, the second race being secured to the mold and the first race to said member and the two races having straight surfaces substantially parallel to the axis of the mold to permit the balls to roll parallel to said axis during rotation of the mold, the races carrying stop-portions to limit the rolling action of the balls short of the point where the balls would leave the races.

5. In a centrifugal casting machine, the combination with a rotary mold, of a ball bearing for the mold comprising an inner race, an outer race, and a plurality of balls between the two races, the second race being secured to the mold and the races being formed with opposed ball contacting surfaces whereby the balls may roll axially of the machine relative to either race.

6. In a centrifugal casting machine, the combination with a rotary mold, of a ball bearing for the mold comprising an inner race, an outer race, and a plurality of balls between the two races, the second race being secured to the mold and the races being formed with substantially parallel ball contacting surfaces to permit one of the races to move axially of the machine relative to the other race.

7. In a centrifugal casting machine, the combination with a rotary mold, of a ball bearing for the mold comprising an inner race, an outer race, and a plurality of balls between the two races, the races being formed with opposed ball contacting surfaces whereby the balls may roll axially of the machine and thereby permit one of the races to move axially of the machine relative to the other race, each race being substantially U-shaped in cross-section to provide a pair of annular oil wells at opposite sides of the line of balls.

8. In a centrifugal casting machine, the combination with a rotary mold, of a ball bearing for the mold comprising an inner race, an outer race, and a plurality of balls between the two races, the races being formed with opposed ball contacting surfaces whereby the balls may roll axially of the machine and thereby permit one of the races to move axially of the machine relative to the other race, one of the races being substantially U-shaped in cross-section to provide an annular oil well at one side of the line of balls.

9. In a centrifugal casting machine, the combination with a rotary mold, of a ball bearing for the mold comprising an inner race, an outer race, and a plurality of balls between the two races, the races being formed with opposed ball contacting surfaces whereby the balls may roll axially of the machine and thereby permit one of the races to move axially of the machine relative to the other race, the races being overlappingly arranged and hollowed out beyond their ball contacting surfaces to provide oil-chambers at opposite sides of the balls.

10. In a centrifugal casting machine the combination with a rotary mold, of a ball bearing for the mold comprising an inner race, an outer race, and a plurality of balls between the two races, the races being formed with opposed ball contacting surfaces whereby the balls may roll axially of the machine and thereby permit one of the races to move axially of the machine relative to the other race, the races being overlappingly arranged and one being hollowed out beyond its ball contacting surface to provide an oil chamber at one side of the balls.

11. In a centrifugal casting machine, the combination with a rotary mold and a member relative to which the mold rotates, of a ball bearing for the mold comprising an inner race, an outer race, and a plurality of balls between the two races, the races being formed with opposed ball contacting surfaces whereby the balls may roll axially of the machine, the rotary mold and said member being formed and arranged to provide a water cooling chamber adjacent to the ball bearing, and one of the ball races being formed and arranged to constitute one of the walls of said chamber thereby to permit the ball bearing to be water cooled.

12. In a centrifugal casting machine, the combination with a rotary mold and a member relative to which the mold rotates, of a ball bearing for the mold comprising an inner race, an outer race, and a plurality of balls between the two races, the races being formed with opposed ball contacting surfaces whereby the balls may roll axially of the machine, the rotary mold and said member being formed and arranged to provide a water cooling chamber adjacent to the ball bearing, and one of the ball races being formed and arranged to constitute one of the walls of said chamber thereby to permit the ball bearing to be water cooled, one of the races being hollowed out beyond its ball-contacting surface to provide an oil-chamber at one side of the balls.

13. In a centrifugal casting machine, the combination with a rotary mold and a member relative to which the mold rotates, of a ball bearing for the mold comprising an inner race, an outer race, and a plurality of balls between the two races, the races being formed with opposed ball contacting surfaces whereby the balls may roll axially of the machine, the rotary mold and said member being formed and arranged to provide a water cooling chamber adjacent to the ball bearing, and one of the ball races being formed and arranged to constitute one of the walls of said chamber thereby to permit the ball bearing to be water cooled, the last mentioned race being hollowed out adjacent to said wall to provide an oil chamber.

14. In a centrifugal casting machine, the combination with a rotary mold and a member upon which the mold is mounted for rotation, of a ball bearing for the mold comprising an inner race, an outer race, a plurality of balls between the two races, and a fixed annular member, the races being formed with opposed ball contacting surfaces whereby one of the races may move axially of the machine relative to the other race, the races being overlappingly arranged and hollowed out beyond their ball contacting surfaces to provide oil-chambers at opposite sides of the balls, the rotary mold and said fixed annular member being formed and arranged to provide a water-cooling chamber therebetween adjacent to the ball bearing, and the parts being also so formed and arranged that annular passages are provided, of too small thickness for the seepage therethrough of oil, between the oil and water chambers.

15. In a centrifugal casting machine, the combination with a rotary mold and a member upon which the mold is mounted for rotation, of a ball bearing for the mold comprising an inner race, an outer race, a plurality of balls between the two races, and a fixed annular member, the races being secured one to the mold and the other to said member and being formed with opposed ball contacting surfaces whereby one of the races may move axially of the machine relative to the other race, the races being overlappingly arranged and one of them hollowed out beyond its ball contacting surface to provide an oil-chamber for the balls, the rotary mold and said fixed annular member being formed and arranged to provide a water-cooling chamber therebetween adjacent to the ball-bearing, and the parts being also so formed and arranged that an annular passage is provided, of too small thickness for the seepage therethrough of oil, between the oil and water chambers, but with said passage of sufficient thickness to prevent the race secured to the mold from completely closing said passage on expansion due to expansion of the mold.

16. In a centrifugal casting machine the combination with a rotary mold and a member upon which the mold is mounted for rotation, of a ball bearing for the mold comprising an inner race, an outer race, and a plurality of balls between the two races, the races being formed with opposed ball contacting surfaces whereby one of the races may move axially of the machine relative to the other race, the parts being shaped and arranged to provide an oil-chamber for the balls and to provide an annular passage surrounding one of the races; the parts also being so formed and arranged that an annular chamber is formed intermediate the ends of the passage, and there being provided an annular packing in said chamber.

17. In a centrifugal casting machine the combination with a rotary mold and a member upon which the mold is mounted for rotation, of a ball bearing for the mold comprising an inner race, an outer race, and a plurality of balls between the two races, the races being formed with opposed ball contacting surfaces whereby one of the races may move axially of the machine relative to the other race, the parts being shaped and arranged to provide an oil-chamber for the balls and to provide an annular passage surrounding one of the races; the parts also being so formed and arranged that an annular chamber is formed intermediate the ends of the passage, and there being provided an annular packing in said chamber, and means for adjusting said packing including a clamp ring adjustable from the exterior of the ball bearing.

18. In an apparatus including rotary and journaling bodies wherein the rotary body is adapted to have greatly higher temperatures than the journaling body, an anti-friction bearing for the rotary body comprising an inner race, an outer race, and a plurality of anti-friction rolling members between the two races, the two races being so formed and arranged and respectively connected to the said two bodies that on an expansion of the rotary body due to a temperature higher than that of the journaling body the race connected to the rotary member expands to move away from the other race.

19. In an apparatus including rotary and journaling bodies wherein the journaling body sleeves the rotary body and wherein the rotary body is adapted to have greatly higher temperatures than the journaling body, an anti-friction bearing for the rotary body comprising a first race, a second race between the first race and the rotary body, and a series of anti-friction rolling members between the races, the first race being secured to the rotary body.

20. In an apparatus including rotary and journaling bodies wherein the journaling body sleeves the rotary body and wherein the rotary body is adapted to have greatly higher temperatures than the journaling body, an anti-friction bearing for the rotary body comprising a first race, a second race between the first race and the rotary body and a series of anti-friction rolling members between the races, the second race being secured to the journaling body and the first race being disposed between the second race and the journaling body.

21. In a centrifugal casting machine, the combination with a rotary-mold inner structure and an outer structure fixed relatively to the inner structure, of an inner race for an anti-friction bearing, and an outer race for said bearing, the inner race being secured to the outer structure and the outer race being secured to the inner structure.

22. In an apparatus including rotary and journaling bodies wherein the rotary body is adapted to have greatly higher temperatures than the journaling body, an anti-friction bearing for the rotary body comprising an inner race, an outer race, and a plurality of anti-friction rolling members between the races, the races being so conformed and arranged as to provide between them an annular chamber of substantially S-shaped cross-section for housing the balls.

23. In an apparatus including rotary and journaling bodies wherein the rotary body is adapted to have greatly higher temperatures than the journaling body, an anti-friction bearing for the rotary body comprising an inner race and an outer race having sleeve parts which overlap, each race having a rib part connected to its sleeve part beyond the zone of overlap, with the rib part of each race extending laterally of the machine beyond the sleeve part of the other race and the two rib parts connected respectively to the rotary and journaling bodies.

24. In an apparatus including rotary and journaling bodies wherein the rotary body is adapted to have greatly higher temperatures than the journaling body, an anti-friction bearing for the rotary body comprising inner and outer ball guiding sleeves, and an annular wall secured to the outer sleeve and fixed on the rotary body.

25. In a centrifugal casting machine the combination with a rotary mold and a journaling support therefor, of an anti-friction bearing interposed between the mold and support and including two annular structures offset respectively from the mold and the support and substantially L-shaped in cross-section with parts overlapping laterally of the machine.

26. In a centrifugal casting machine, in combination, a rotary mold carrying an annular pocket having an outer substantially cylindrical wall, and a journal-support for the mold having a sleeve-like part for insertion in said pocket, the inner surface of the pocket's cylindrical wall and the outer surface of the sleeve-like part being conformed to provide opposed co-acting guiding surfaces for a plurality of anti-friction roller members.

27. In a centrifugal casting machine, in combination, a rotary mold carrying a sleeve-like part and a journal-support for the mold carrying an annular pocket having an outer substantially cylindrical wall for lying inside said sleeve-like part, the pocket's cylindrical wall and the sleeve-like part being conformed to provide opposed co-acting ball-guiding surfaces for a plurality of anti-friction roller members.

28. The process of cooling an anti-friction bearing for the rotary mold of a centrifugal casting machine, which consists in providing a single water circulation and confining and guiding said circulation to cause the circulating water first to pass in contact with the mold to reduce the temperature thereof and thereafter in contact with the bearing to reduce the temperature thereof.

29. The process of cooling an anti-friction bearing for the rotary mold of a centrifugal casting machine, said bearing including inner and outer races one secured to the mold, which consists in providing a single water circulation and confining and guiding said circulation to cause the circulating water first to pass in contact with the mold to reduce the temperature thereof and thereafter in contact with the race of the bearing secured to the mold to cool said bearing.

30. The process of cooling an anti-friction bearing for the rotary mold of a centrifugal casting machine, said bearing including inner and outer races one secured to the mold, which consists in providing a single water circulation and confining and guiding said circulation to cause the circulating water first to pass in contact with the mold to reduce the temperature thereof and thereafter in contact with the bearing to reduce the temperature thereof, while reducing the cross-sectional area of the flow as the water circulates in contact with the bearing to increase the refrigeration effect of the water heated from previous contact with the mold.

31. In a centrifugal casting machine, the combination with the rotary mold, of an anti-friction bearing therefor including a race-ring having a wall substantially parallel to the mold and a wall angularly disposed relative to the first wall, a jacketing member providing a chamber for a cooling circulation for the mold, and a jacketing member providing a chamber for a cooling circulation for said race-ring, the parts being so formed and arranged as to provide a communication passage between the two chambers.

32. In a centrifugal casting machine, the combination with the rotary mold, of an anti-friction bearing therefor including a race-ring having a wall substantially parallel to the mold and a wall angularly disposed relative to the first wall, a jacketing member providing a chamber for a cooling circulation for the mold, and a jacketing member providing a chamber for a cooling circulation for said race-ring, the parts being so formed and arranged as to provide a communication passage between the two chambers, the cross-sectional area of the passage being less than the cross-sectional area of either of the two chambers.

33. In a centrifugal casting machine, the combination with the rotary mold, of an anti-friction bearing therefor including a race-ring having a wall substantially parallel to the mold and a wall angularly disposed relative to the first wall, a jacketing member providing a chamber for a cooling circulation for the mold, and a jacketing member providing a chamber for a cooling circulation for said race-ring, the parts being so formed and arranged as to provide a communication passage between the two chambers, the cross-sectional area of the passage being less than the cross-sectional area of the chamber provided by the jacketing member for the mold.

In testimony whereof I have signed my name to this specification.

DIMITRI SENSAUD DE LAVAUD.